United States Patent [19]

Bentzien et al.

[11] Patent Number: 5,307,916
[45] Date of Patent: May 3, 1994

[54] SENSING DEVICE

[75] Inventors: Dean L. Bentzien, Brookfield; Hermann Dohl, Richfield; Armin Dohl, Germantown, all of Wis.

[73] Assignee: Tooling & Productions Systems, Inc., Sussex, Wis.

[21] Appl. No.: 24,540

[22] Filed: Mar. 1, 1993

[51] Int. Cl.$^5$ .............................................. F16D 71/04
[52] U.S. Cl. .......................... 192/129 R; 192/129 A; 192/139
[58] Field of Search .......... 192/129 R, 129 A, 125 A, 192/139, 142 A

[56] References Cited

U.S. PATENT DOCUMENTS

| 3,225,878 | 12/1965 | Estephanio | 192/129 R |
| 4,066,013 | 1/1978 | Skoglund et al. | 192/129 R X |
| 4,780,785 | 10/1988 | Schabert et al. | 192/139 X |

Primary Examiner—Leslie A. Braun
Assistant Examiner—Andrea Pitts
Attorney, Agent, or Firm—Joseph W. Farley

[57] ABSTRACT

A sensing device for monitoring the presence of a tool or other object on an automatic machine comprises a sensing head adapted to be mounted on the machine. The sensing head has a sensing needle mounted on the output shaft of a reversible motor actuated on each cycle of the automatic machine for movement through a swing angle such that the sensing needle will either contact the monitored object or complete the full swing angle movement resulting in a cycle continue or cycle stop signal to the automatic machine control. The swing angle is manually adjustable by a setting ring on the sensing head for either clockwise or counterclockwise initial rotation of the sensing needle through any desired angle up to 180° degrees.

9 Claims, 4 Drawing Sheets

SENSING DEVICE

This invention relates to improvements in a sensing device, for monitoring a tool or other object on an automatic machine, and detecting a broken or missing tool or the absence of some other object, such as a workpiece, required for proper operation of the machine.

An undetected broken or missing tool, or other object, on an automatic machine can result in significant machine damage or tooling loss. Hence, sensing devices of the type to which the present invention is directed have been developed and consist of a sensing head and a control unit.

The sensing head, which includes a sensing needle projecting radially from the output end of a shaft driven by a motor encapsulated within the sensing head, is adapted to be mounted on the automatic machine so that the sensing needle, in response to energization of the motor, will be moved from a starting position through space normally occupied by the monitored object.

The control unit, which is installed in the electrical control cabinet of the automatic machine and is connected electrically to the sensing head, initiates a detecting cycle of the sensing head at the start of each cycle of the machine, receives from the sensing head a signal indicating that the monitored object has or has not been detected, and sends a cycle continue or a cycle stop signal to the machine control. In a detecting cycle of the sensing head, its motor is energized to move the sensing needle from the starting position through a certain swing angle and return to the starting position. During movement through this swing angle, the sensing needle will either contact the monitored object or will complete the full swing angle of movement, and from these two possible results the control unit provides the appropriate cycle continue or cycle stop signal to the machine control.

Typical commercially available sensing heads are operable on a sensing cycle with initial movement of the sensing needle in a clockwise direction, in a counterclockwise direction, or in either direction selectable at the control unit. Typical sensing heads are also capable of providing fixed or variable swing angles. In the case of fixed swing angles, sensing heads are available with fixed direction swing angles such as 45, 90, 120 and 180 degrees. Variable swing angle sensing heads utilize a stepping motor within the sensing head itself and the desired swing angle is electronically learned or must be selected or adjusted at the control unit.

The present invention provides a sensing device in which the swing angle is manually settable within the sensing head itself at any angle up to 180 degrees, and preferably for either clockwise or counterclockwise initial rotation of the sensing needle, thereby providing a more versatile sensing device at a reduced cost.

A sensing device of the invention includes a sensing head comprising a housing, a reversible motor mounted therein, and a drive shaft rotatably driven by the motor, the drive shaft having a portion projecting from one end of the housing. A movable electrical contact element is carried by the drive shaft within the housing, and at least one fixed electrical contact element carried by the housing is engageable by the movable contact element in response to rotation of the drive shaft in one direction. A sensing needle, attached to the projecting portion of the drive shaft and extending generally radially therefrom, is adapted to contact an object to be detected in response to rotation of the drive shaft in the one direction from a starting position. The angular displacement of the starting position relative to the fixed electrical contact element, i.e., the swing angle, is selectively settable by setting means comprising a stop movable with the drive shaft, a setting ring rotatably supported within the housing radially outwardly of and concentric with the drive shaft, and at least one abutment fixed to the setting ring in the path of movement of the stop. A manually operable adjusting member carried by the setting ring externally of the housing enables the setting ring and its abutment to be rotated to a desired position of the abutment relative to the fixed contact element. This desired position is then fixed by a locking device which prevents rotation of the setting ring.

In a sensing device of the invention which is operable in either a clockwise or a counterclockwise initial direction from a starting position, a pair of fixed electrical contact elements engageable by the movable contact element is carried by the housing radially outwardly of the drive shaft with a circumferential spacing between the pair of approximately 180 degrees. One of the fixed contact elements is engageable by the movable contact element in response to rotation of the drive shaft in one (e.g., clockwise) direction, and the other fixed contact element is engageable by the movable contact element in response to rotation of the drive shaft in the opposite, counter-clockwise direction. A pair of abutments is fixed to the setting ring in the path of rotary movement of the stop with a circumferential spacing between the pair of approximately 180 degrees. These abutments are positionable relative to the pair of fixed contact elements through rotation of the setting ring by the manually operable adjusting member, one abutment relative to one fixed contact element and the other abutment relative to the other fixed contact element whereby the starting position and swing angle can be selectively set for either direction of initial rotation of the motor.

Preferably, the movable contact element and the stop are aligned axially of the drive shaft.

A control unit for the sensing head of a sensing device of the invention is provided with a reversible polarity energizing circuit for the sensing head motor, and with a timer operable to cause the energizing circuit polarity to reverse after an interval greater than that required for rotation of the drive shaft and sensing needle from the starting position to a position in which a fixed electrical contact element is engaged by the movable electrical contact element. Thus, on each detecting cycle of the sensing head, the movable contact element rotates with the sensing needle in one direction towards a fixed contact element. If this rotation is interrupted by engagement between the sensing needle and the monitored object, the sensing needle remains in engagement therewith for the duration of the timing interval and is then returned by reversal of the motor energizing circuit to the starting position defined by engagement between the stop and an abutment. If this rotation is not interrupted and the movable contact engages a fixed contact, a stop command signal is transmitted from the sensing head to the control unit and relayed thereby to the automatic machine control. In either event, the reversed energization of the sensing head motor is maintained until the beginning of the next detection cycle thereby maintaining the stop in contact with an abutment and the sensing needle in the selected starting position.

Other features and advantages of the invention will appear from the description to follow of the embodiment shown in the accompanying drawings.

DETAILED DESCRIPTION

Figure 1:
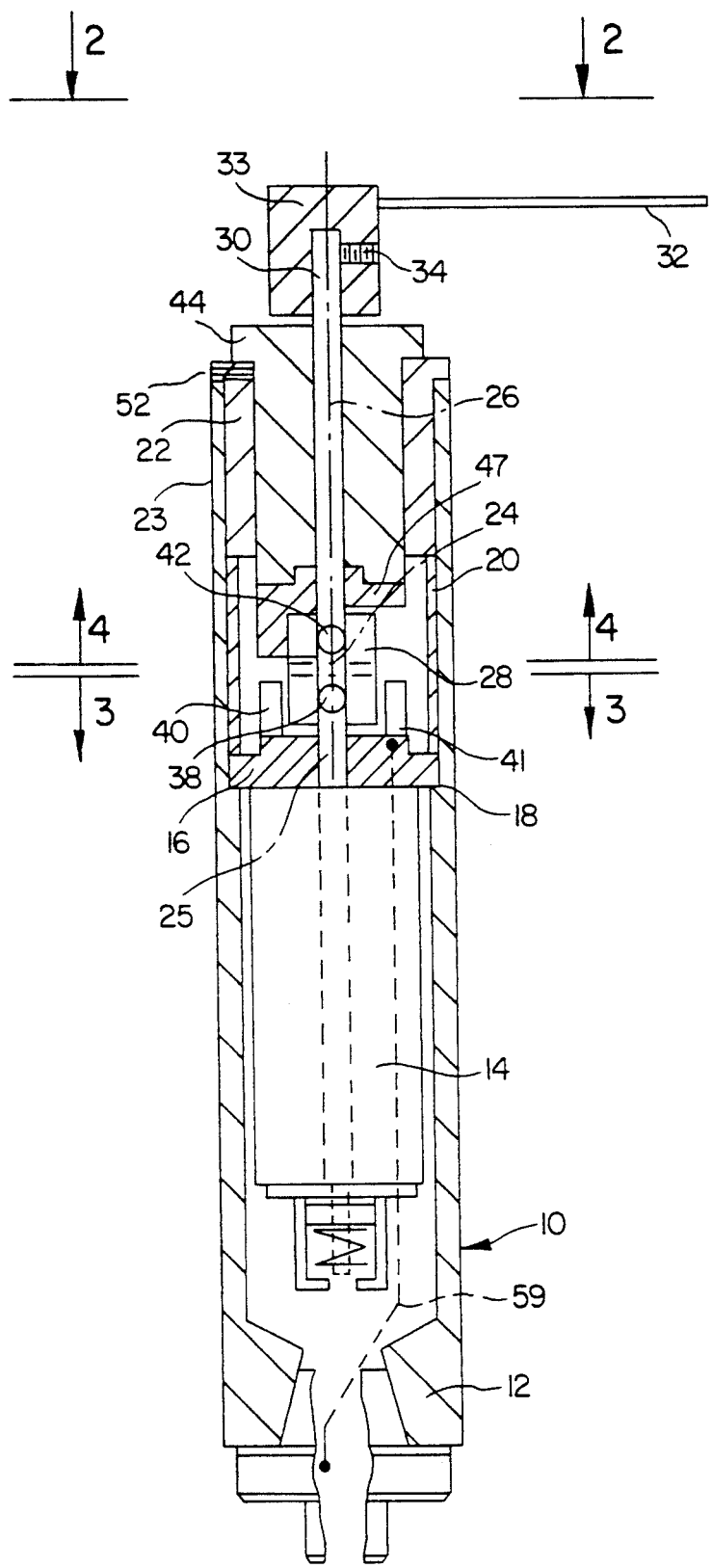
FIG. 1 a sectional elevation of a bidirectional sensing head of the invention, taken as indicated by the line 1—1 of FIG. 3.
Figure 2:
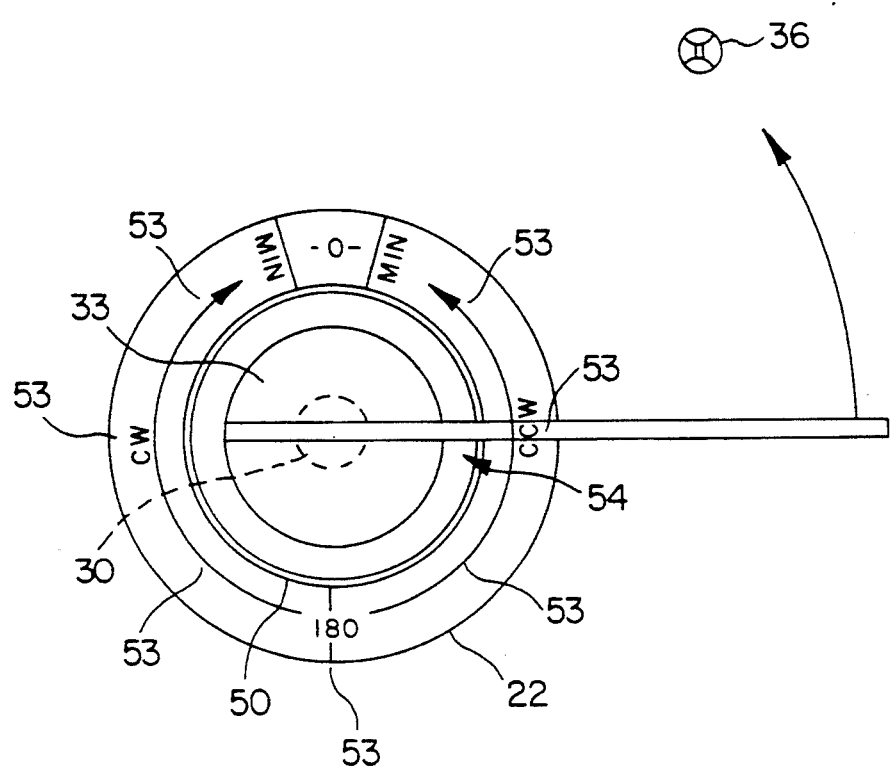
FIG. 2 is an end plan view of the sensing head, taken as indicated by the arrows 2, 2 of FIG. 1.
Figure 3:
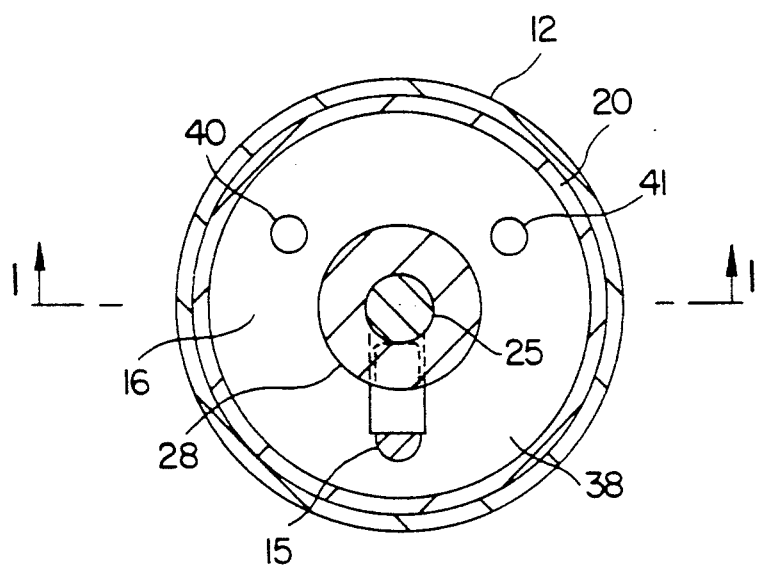
FIG. 3 is a sectional plan view, taken as indicated by the line 3—3 of FIG. 1, showing the fixed and movable contact elements.

With reference to FIGS. 1-3, a sensing head 10 comprises a cylindrical tubular housing 12 having a reversible DC motor 14 mounted therein. As shown, the casing of the motor 14 is connected by screws 15 (FIG. 3) to a clamping ring 16 held against an internal shoulder 18 of the housing by a clamping bushing 20 and a retaining ring 22 press fitted in the housing end portion 23.

A drive shaft 24, formed by a motor output shaft 25 and an extension shaft 26 connected axially by a tubular coupling 28, has a portion 30 projecting from one end of the housing 12. A sensing needle 32 is attached to the projecting portion 30 of the drive shaft by a cap 33 and a set screw 34, extends generally radially of the drive shaft, and is adapted to contact an object such as a tool 36 (FIG. 2) in response to rotation of the drive shaft 24 in one direction from a starting position which for the sensing needle 32 can be set as desired according to the placement of the cap 33 on the shaft, and according to the setting of the angular displacement described below.

A movable electrical contact element 38 is carried by the drive shaft by threaded engagement with the tubular coupling 28 and connects the motor output shaft 25 thereto.

A pair of fixed electrical contact elements 40 and 41 best shown in FIG. 3 is carried by the housing through attachment to the motor clamping ring 16 by the screws 15. The fixed electrical contact elements 40 and 41 are positioned radially outwardly of the drive shaft 24 with a circumferential spacing of approximately 180 degrees between them. One of the fixed contact elements 40 is engageable by the movable contact element 38 in response to rotation of the drive shaft in one direction (clockwise as shown in FIG. 3) from a starting position; and the other fixed contact element 41 is engageable by the movable contact element 38 in response to rotation of the drive shaft in the opposite, counterclockwise direction from a starting position.

The angular displacement of the starting position of the movable contact element 38 relative to the fixed contact element 40 or 41 is selectively settable. A stop 42, (FIGS. 4 and 4A) having threaded engagement with the tubular coupling 28, connects the extension shaft 26 thereto and is aligned axially with the movable contact element 38. A setting ring 44 is rotatably supported within the housing retaining ring 22 radially outwardly of the drive shaft extension 26 and concentrically therewith. Fixed to the setting ring 44 by screws 46 is a disc 47 having a pair of abutments 48 and 49 located in the path of rotary movement of the stop 42 and spaced apart circumferentially approximately 180 degrees. A manually operable, annular adjusting ring 50 carried by the setting ring 44 externally of the housing retaining ring 22 enables the setting ring 44 and the abutments 48 and 49 to be rotated in either direction relative to the fixed electrical contact elements 40 and 41. A desired angular displacement between the abutment 48 and fixed contact element 41, or between the abutment 49 and fixed contact element 40 is thereby established by the position of the setting ring 44, and a set screw 52 is provided in the retaining ring 22 for locking the setting ring in position.

Position setting indicia shown in FIG. 2 are provided on the retaining ring 22 and o the adjusting ring 50. When the set screw 52 is loosened, the adjusting ring 50 is movable to position the setting ring at any desired swing angle up to 180 degrees in either the clockwise or the counterclockwise direction indicated by the segments labelled CW and CCW, respectively, and divided into 45 degree increments by radial lines 53 on the retaining ring 22. The position of an index mark 54 on the adjusting ring 50 relative to the CW and CCW segments and the lines 53 indicates the degree and direction of the swing angle.

Figure 4:
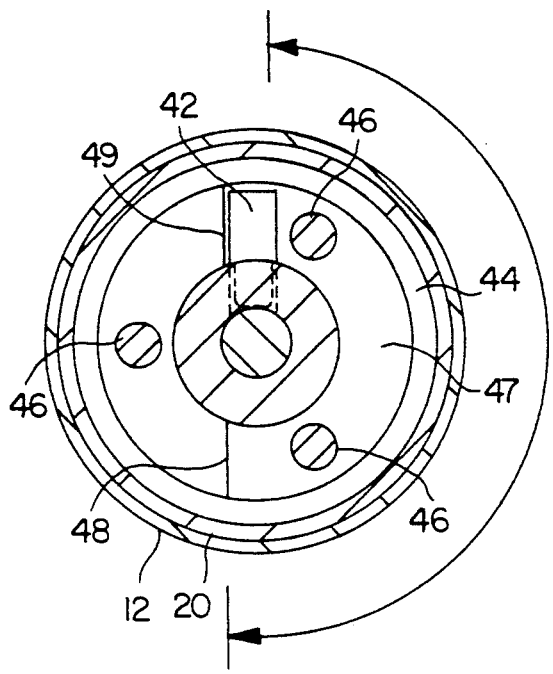
FIG. 4 is a sectional plan view, taken as indicated by the line 4—4 of FIG. 1, showing the stop and abutments set for a 90 degree counterclockwise, rotation swing angle.
Figure 4A:
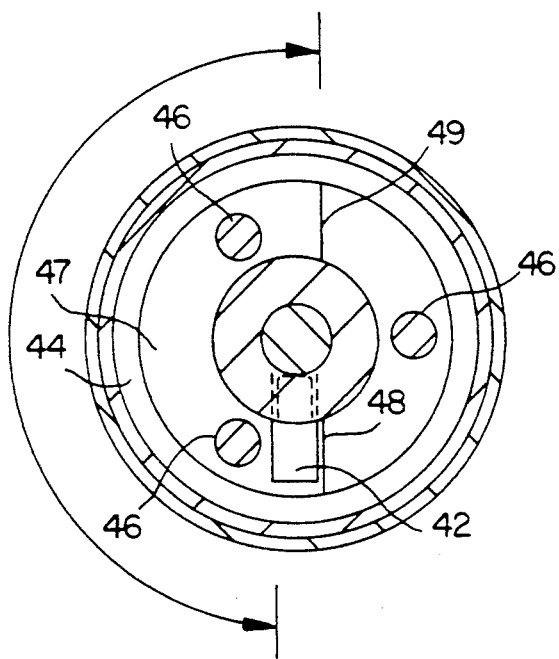
FIG. 4A is a sectional plan view similar to FIG. 4 but showing the abutments set for clockwise rotation; and, FIG. 5 is a schematic electrical diagram of the sensing head and control unit.

In FIG. 2, the position of the index mark 54 approximately indicates a 90 degree swing angle in the CCW direction, which position is also illustrated in FIG. 3. FIG. 4, a view taken in the direction opposite to FIGS. 2 and 3, shows the stop 42 engaging the abutment 49 and hence movable only in the CCW direction. FIG. 3 shows the movable electrical contact 38 spaced approximately 90 degrees from the fixed electrical contact 41, which is greater than the swing angle between the needle 32 and object 36 in FIG. 2. FIG. 4A illustrates an approximately 90 degree CW swing angle setting in which the stop 42 engages the abutment 48.

Figure 5:
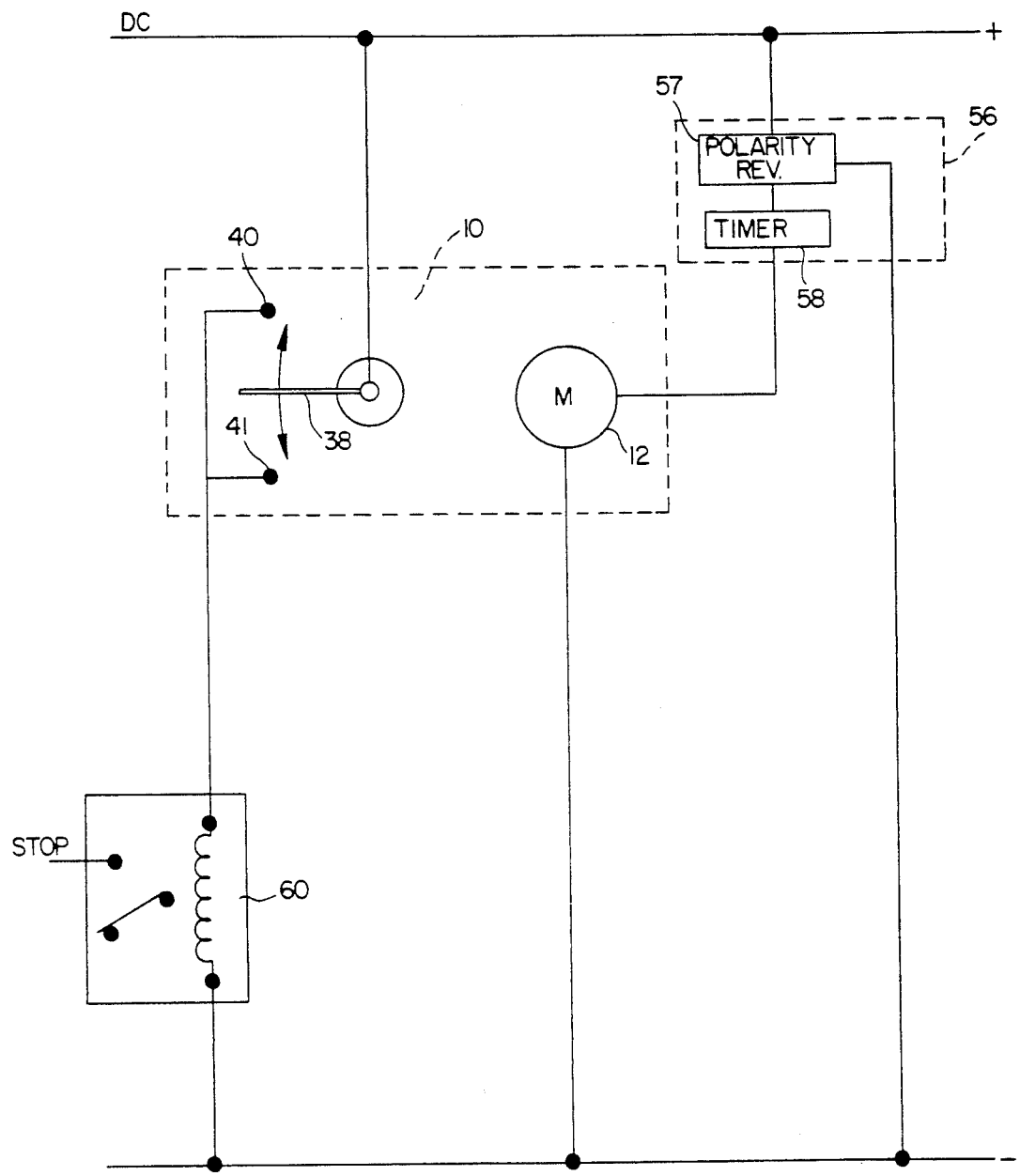

The swing angle direction also depends upon the energization of the motor 12. As schematically shown in FIG. 5, a control unit 56 for the sensing head 10 includes a polarity reversing flip-flop circuit 57 connected to the motor 12 and controlled by a timer 58. The polarity reversing circuit is set to energize the motor in an initial CW or CCW direction at the beginning of each detecting cycle of operation of the sensing head in response to a start signal from the control panel of an automatic machine. This directional energization of the motor 12 is maintained by the timer 58 for an interval sufficient for the sensing needle to be rotated through the set swing angle, or in other words, for the movable electrical contact 38 to engage either the fixed electrical contact 40 or 41 depending on the direction of motor rotation. Such engagement between the electrical contacts results in the energization of a relay 60 through a circuit 59 (contained in part within the housing 12) and the output of a STOP signal to the machine control. Non-engagement between the movable electrical contact 38 and either one of the fixed electrical contacts 40 or 41 indicates that the sensing needle 32 has engaged the object 36 being monitored. After the timing interval described above, the timer 58 causes the polarity output of the circuit 57 to reverse and causes the output of a GO signal to the machine control if a STOP signal has not been previously outputted. The reverse polarity output of the circuit 57 is continued until the start of the next detecting cycle, thereby maintaining the stop 42 in engagement with either the abutment 48 or 49.

We claim:

1. A sensing device including a sensing head comprising a housing, a reversible motor mounted therein, a drive shaft rotatably driven by said motor and having a portion projecting from one end of said housing;

a movable electrical contact element carried by said drive shaft within said housing, at least one fixed electrical contact element carried by said housing for engagement by said movable contact element in response to rotation of said drive shaft in one direction;

a sensing needle attached to said projecting portion of said drive shaft and extending generally radially therefrom, said sensing needle being adapted to contact an object to be detected in response to rotation of said drive shaft in said one direction from a starting position; and means for selectively setting the angular displacement of said starting position relative to said fixed contact element, said setting means comprising a stop movable with said drive shaft, a setting ring rotatably supported within said housing radially outwardly of said drive shaft and concentrically therewith, at least one abutment fixed to said setting ring in the path of rotary movement of said stop, manually operable adjusting means carried by said setting ring externally of said housing for rotatably positioning said setting ring and abutment relative to said fixed contact element, and locking means for fixing the position of said setting ring.

2. A sensing device according to claim 1, further including control means connected to said sensing head, said control means having circuit means for reversibly energizing said motor, and timing means for reversing said circuit means after an interval greater than that required for rotation of said drive shaft from said starting position to a position in which said fixed contact element is engaged by said movable contact element.

3. A sensing device according to claim 1, wherein said movable contact element and said stop are aligned axially of said drive shaft.

4. A sensing device according to claim 3, wherein said housing includes a tubular cylindrical member, a retaining ring fitted in said tubular cylindrical member at said one end of said housing, said setting ring extending through said retaining ring and being rotatably supported thereby.

5. A sensing device according to claim 4, wherein said manually operable adjusting means comprises an annular ring carried by said setting ring externally of said retaining ring, said drive shaft projecting portion extending through and outwardly of said annular ring, and angular starting position setting indicia provided on said annular ring and said retaining ring.

6. A sensing device according to claim 4, wherein said drive shaft comprises a shaft of said motor, an extension shaft, and tubular coupling means for connecting said motor and extension shafts in axial alignment, said movable contact element and said stop each extending radially through said tubular coupling means in threaded engagement therewith, said motor shaft and said extension shaft being respectively connected to said tubular coupling means by said movable contact element and by said stop.

7. A sensing device according to claim 6, comprising a pair of fixed contact elements carried by said housing for engagement by said movable contact element, said pair of fixed contact elements being positioned radially outwardly of said drive shaft with a circumferential spacing of approximately 180 degrees between them, one of said fixed contact elements being engageable by said movable contact element in response to rotation of said drive shaft in one direction, the other of said fixed contact elements being engageable by said movable contact element in response to rotation of said drive shaft in the opposite direction; and a pair of abutments is fixed to said setting ring in the path of rotary movement of said stop, said pair of abutments being spaced apart circumferentially approximately 180 degrees and being positionable relative to said pair of fixed contact elements by said manually operable setting means, one of said pair of abutments being positionable angularly relative to said one fixed contact element and the other of said pair of abutments being positionable angularly relative to said other fixed contact element whereby said means for selectively setting said starting position is operable for either direction of rotation of said motor.

8. A sensing device according to claim 1, comprising a pair of fixed contact elements carried by said housing for engagement by said movable contact element, said pair of fixed contact elements being positioned radially outwardly of said drive shaft with a circumferential spacing of approximately 180 degrees between them, one of said fixed contact elements being engageable by said movable contact element in response to rotation of said drive shaft in one direction, the other of said fixed contact elements being engageable by said movable contact element in response to rotation of said drive shaft in the opposite direction; and a pair of abutments is fixed to said setting ring in the path of rotary movement of said stop, said pair of abutments being spaced apart circumferentially approximately 180 degrees and being positionable relative to said pair of fixed contact elements by said manually operable setting means, one of said pair of abutments being positionable angularly relative to said one fixed contact element and the other of said pair of abutments being positionable angularly relative to said other fixed contact element whereby said means for selectively setting said starting position is operable for either direction of rotation of said motor.

9. A sensing device according to claim 8, wherein said movable contact element and said stop are aligned axially of said drive shaft.

* * * * *